United States Patent
Takashima et al.

(10) Patent No.: US 9,114,715 B2
(45) Date of Patent: Aug. 25, 2015

(54) ELECTRONIC CONTROL UNIT

(71) Applicants: KEIHIN CORPORATION, Tokyo (JP); HONDA MOTOR CO., LTD., Tokyo (JP)

(72) Inventors: Yuzuru Takashima, Utsunomiya (JP); Masaki Tanno, Utsunomiya (JP); Takeshi Yamada, Tokyo (JP); Haruki Umeya, Utsunomiya (JP); Shinichi Daibo, Utsunomiya (JP)

(73) Assignees: KEIHIN CORPORATION (JP); HONDA MOTOR CO., LTD. (JP)

( * ) Notice: Subject to any disclaimer, the term of this patent is extended or adjusted under 35 U.S.C. 154(b) by 314 days.

(21) Appl. No.: 13/653,815

(22) Filed: Oct. 17, 2012

(65) Prior Publication Data

US 2013/0099740 A1  Apr. 25, 2013

(30) Foreign Application Priority Data

Oct. 21, 2011  (JP) .................. 2011-231806
Oct. 21, 2011  (JP) .................. 2011-231808
Oct. 21, 2011  (JP) .................. 2011-231809

(51) Int. Cl.
| | |
|---|---|
| H02J 7/14 | (2006.01) |
| H02J 7/00 | (2006.01) |
| B60L 1/00 | (2006.01) |
| B60L 11/00 | (2006.01) |

(Continued)

(52) U.S. Cl.
CPC .............. *B60L 11/1816* (2013.01); *B60L 3/00* (2013.01); *Y02T 10/7005* (2013.01); *Y02T 90/14* (2013.01)

(58) Field of Classification Search
CPC ...... B60L 11/182; B60L 11/18; H02J 7/0031; Y02T 10/72; Y02T 10/92; Y02T 10/7077

USPC ............... 320/109, 104, 134; 701/22; 307/9.1
See application file for complete search history.

(56) References Cited

U.S. PATENT DOCUMENTS 8,198,855 B2 *  6/2012  Fukui et al. ................... 320/104
8,258,744 B2 *  9/2012  Ishii et al. ..................... 320/104

(Continued)

FOREIGN PATENT DOCUMENTS

JP  H06098585 A  4/1994
JP  H1165878 A  3/1999

(Continued)

OTHER PUBLICATIONS

Japanese Notice of Reasons for Rejection corresponding to Application No. 2011-231809; Date of Mailing: May 26, 2015, with English translation.
Notice of Reasons for Rejection for corresponding Japanese Application No. 2011-231808, Date of Mailing Jul. 7, 2015; with English Translation.

*Primary Examiner* — M'Baye Diao
(74) *Attorney, Agent, or Firm* — Cantor Colburn LLP

(57) ABSTRACT

A processor of an electronic control unit performs at least one of a first diagnosis process of determining whether or not a switching element is abnormal based on a signal output from an abnormality diagnosis circuit in a state where a first diagnosis voltage supply circuit is controlled to supply a first diagnosis voltage to a control line and a second diagnosis process of determining whether or not a pilot signal line is abnormal based on the signal output from the abnormality diagnosis circuit obtained in a state where a second diagnosis voltage supply circuit is controlled to supply a second diagnosis voltage to the pilot signal line.

13 Claims, 10 Drawing Sheets

(51) Int. Cl.
 *B60L 11/18* (2006.01)
 *B60L 3/00* (2006.01)

(56) References Cited

U.S. PATENT DOCUMENTS

| | | | |
|---|---|---|---|
| 8,618,767 B2* | 12/2013 | Ishii et al. | 320/104 |
| 8,791,666 B2* | 7/2014 | Yokoyama et al. | 320/109 |
| 8,810,060 B2* | 8/2014 | Kamaga | 307/9.1 |
| 8,855,843 B2* | 10/2014 | Kawasaki et al. | 701/22 |
| 2010/0127565 A1* | 5/2010 | Fukazu et al. | 307/9.1 |
| 2012/0286729 A1 | 11/2012 | Yegin et al. | |

FOREIGN PATENT DOCUMENTS

| | | |
|---|---|---|
| JP | 2009-71989 A | 4/2009 |
| JP | 2009254187 A | 10/2009 |
| JP | 2010081740 A | 4/2010 |
| JP | 2010098779 A | 4/2010 |
| JP | 2011024317 A | 2/2011 |
| WO | 2010044317 A1 | 4/2010 |

* cited by examiner

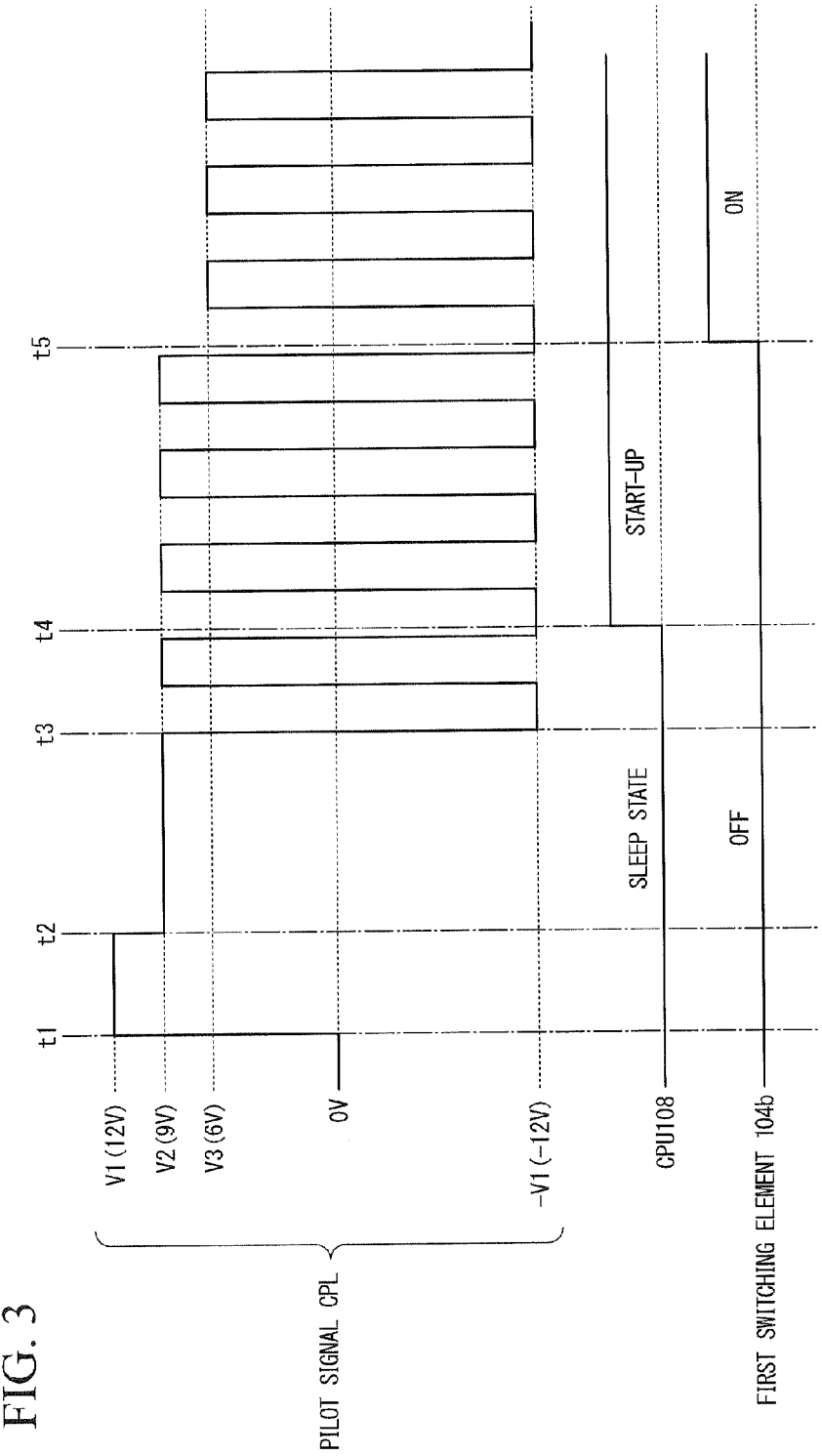

ELECTRONIC CONTROL UNIT

BACKGROUND OF THE INVENTION

The present invention relates to an electronic control unit.

Priority is claimed on Japanese Patent Application Nos. 2011-231806, 2011-231808, and 2011-231809, filed on Oct. 21, 2011, the contents of which are incorporated herein by reference.

FIELD OF THE INVENTION

In recent years, vehicles (hereinafter, collectively referred to as plug-in vehicles) such as electric cars or plug-in hybrid cars that can be charged by the use of an external power supply have been increasingly put to practical use. A dedicated charging cable having a control unit called a CCID (Charge Circuit Interrupt Device) is used to connect a plug-in vehicle to an external power supply.

The standard on an interface between the charging cable and the plug-in vehicle is defined by the "SAE (Electric Vehicle Conductive Charge Coupler) standard" of the U.S. or the "General Requirements for Electric Vehicle Conductive Charging System (the Japanese Electric Vehicle Standard)" of Japan. The charging sequence of a plug-in vehicle defined in the standard is substantially as follows.

First, a CCID of a charging cable transmits a control pilot signal (hereinafter, abbreviated as a pilot signal) to a charging-control ECU (Electronic Control Unit) mounted on a plug-in vehicle and determines that the charging cable is connected to the plug-in vehicle when the voltage of the pilot signal is changed from an initial value V1 (for example, 12 V) to V2 (for example, 9 V).

Then, the CCID of the charging cable informs the ECU of the plug-in vehicle of the rated current of a power supply facility by transmitting a pilot signal with a duty ratio corresponding to the rated current of the power supply facility (including an external power supply and a charging cable).

The ECU of the plug-in vehicle informs the CCID of the charging cable of the completion of the preparation for charging by changing the voltage of the pilot signal from V2 to V3 (for example, 6 V).

Then, when detecting that the voltage of the pilot signal has changed from V2 to V3, the CCID of the charging cable determines that the preparation of charging of the plug-in vehicle side is completed, and turns on a relay used to supply the power of the external power supply to the plug-in vehicle (that is, starts the supply of power).

In this way, the pilot signal is a signal essential for controlling the charging of the plug-in vehicle and it is very important to detect abnormality of the pilot signal. For example, Japanese Unexamined Patent Application, First Publication No. 2009-71989 discloses a technique of connecting a control line used for transmission of a pilot signal on a plug-in vehicle to the ground via a switch and detecting a disconnection of a pilot signal line extending from a charging port of the plug-in vehicle to an ECU based on a change in potential of the control line when the switch is turned on.

DESCRIPTION OF RELATED ART

As described above, the ECU of the plug-in vehicle is provided with a pilot voltage setting circuit used to change the voltage of a pilot signal transmitted from the CCID of the charging cable in a stepwise manner. In general, the pilot voltage setting circuit is a serial circuit of a pull-down resistor and a switching element, which is connected between the pilot signal line and the ground in the ECU.

When the processor in the ECU changes the voltage of a pilot signal, the switching element of the pilot voltage setting circuit is turned on.

When the switching element of the pilot voltage setting circuit is out of order, the voltage of a pilot signal cannot be changed and thus a circuit for diagnosing the disorder of the switching element is necessary. However, such a circuit is not disclosed in Japanese Unexamined Patent Application, First Publication No. 2009-71989.

In the technique described in Japanese Unexamined Patent Application, First Publication No. 2009-71989, a switching connecting the pilot signal line to the ground is provided and it is determined that the pilot signal line is normal (no disconnection) when the potential of the pilot signal line is dropped to the ground level by turning on the switch. However, when the pilot signal line is subjected to an earth fault, the potential of the pilot signal line also becomes the ground level. Accordingly, the pilot signal line may be erroneously determined to be normal, while actually being abnormal.

The invention is made in consideration of the above-mentioned circumstances and an object thereof is to provide an electronic control unit that can diagnose at least one of an abnormality of a switching element disposed in a pilot voltage setting circuit so as to change a pilot signal in a stepwise manner and an abnormality of a pilot signal line including disconnection and earth fault.

SUMMARY OF THE INVENTION

The present invention employs the following configurations to solve the above problems.

(1) According to an aspect of the invention, there is provided an electronic control unit that is mounted on a vehicle which is configured to be charged with an external power supply and that receives a pilot signal via a charging cable before being supplied with a power when the vehicle is connected to the external power supply via the charging cable, the electronic control unit including: a control line that is connected to a pilot signal line connecting a charging cable connector disposed in the vehicle to the electronic control unit; a processor that performs a process necessary for the control of charging based on the pilot signal input via the control line; a pilot voltage setting circuit that is connected between the control line and a ground and that includes a serial circuit of a pull-down resistor and a switching element controlled by the processor; a voltage supply circuit that includes at least one of a first diagnosis voltage supply circuit supplying a first diagnosis voltage to the control line under control of the processor and a second diagnosis voltage supply circuit supplying a second diagnosis voltage to the pilot signal line via an abnormality diagnosis line connected to the pilot signal line at the charging cable connector under the control of the processor; and an abnormality diagnosis circuit that is connected to the pull-down resistor and the switching element and that outputs an abnormality diagnosis result signal of at least one of the switching element and the pilot signal line to the processor, wherein the processor performs at least one of a first diagnosis process of determining whether or not the switching element is abnormal based on an output signal of the abnormality diagnosis circuit obtained when turning on and off the switching element while controlling the first diagnosis voltage supply circuit to supply the first diagnosis voltage to the control line and a second diagnosis process of determining whether or not the pilot signal line is abnormal based on the output signal of the abnormality diagnosis circuit obtained when controlling the second diagnosis voltage supply circuit to supply the second diagnosis voltage to the pilot signal line in a state where the switching element is maintained in OFF state.

(2) In the electronic control unit described in (1) above, the voltage supply circuit may include only the first diagnosis voltage supply circuit, and the processor may determine whether or not the switching element is abnormal based on a level of the output signal of the abnormality diagnosis circuit obtained when turning on and off the switching element while controlling the first diagnosis voltage supply circuit to supply the first diagnosis voltage of a fixed voltage to the control line as the first diagnosis process.

(3) In the electronic control unit described in (1) above, the voltage supply circuit may include only the first diagnosis voltage supply circuit, and the processor may determine whether or not the switching element is abnormal based on an edge of the output signal of the abnormality diagnosis circuit obtained when turning on and off the switching element while controlling the first diagnosis voltage supply circuit to supply the pulse-like first diagnosis voltage with a predetermined frequency to the control line as the first diagnosis process.

(4) In the electronic control unit described in (1) above, the voltage supply circuit may include only the second diagnosis voltage supply circuit, and the processor may determine whether or not the pilot signal line is abnormal based on a level of the output signal of the abnormality diagnosis circuit obtained when controlling the second diagnosis voltage supply circuit to supply the second diagnosis voltage of a fixed voltage to the pilot signal line in a state where the switching element is maintained in OFF state as the second diagnosis process.

(5) In the electronic control unit described in (1) above, the voltage supply circuit may include only the second diagnosis voltage supply circuit, and the processor may determine whether or not the pilot signal line is abnormal based on an edge of the output signal of the abnormality diagnosis circuit obtained when controlling the second diagnosis voltage supply circuit to supply the pulse-like second diagnosis voltage with a predetermined frequency to the pilot signal line in a state where the switching element is maintained in OFF state as the second diagnosis process.

(6) In the electronic control unit described in (4) or (5) above, the processor may perform the second diagnosis process when the charging cable is not connected to the vehicle.

(7) In the electronic control unit described in (1) above, the voltage supply circuit may include both the first diagnosis voltage supply circuit and the second diagnosis voltage supply circuit, and the processor may perform the second diagnosis process after performing the first diagnosis process.

(8) In the electronic control unit described in (7) above, the processor may first determine whether or not the switching element is abnormal based on a level of the output signal of the abnormality diagnosis circuit obtained when turning on and off the switching element while controlling the first diagnosis voltage supply circuit to supply the first diagnosis voltage of a fixed voltage to the control line as the first diagnosis process, and then may determine whether or not the pilot signal line is abnormal based on a level of the output signal of the abnormality diagnosis circuit obtained when controlling the second diagnosis voltage supply circuit to supply the second diagnosis voltage of a fixed voltage to the pilot signal line in a state where the switching element is maintained in OFF state as the second diagnosis process.

(9) In the electronic control unit described in (7) above, the processor may first determines whether or not the switching element is abnormal based on an edge of the output signal of the abnormality diagnosis circuit obtained when turning on and off the switching element while controlling the first diagnosis voltage supply circuit to supply the pulse-like first diagnosis voltage with a predetermined frequency to the control line as the first diagnosis process, and then may determine whether or not the pilot signal line is abnormal based on an edge of the output signal of the abnormality diagnosis circuit obtained when controlling the second diagnosis voltage supply circuit to supply the pulse-like second diagnosis voltage with a predetermined frequency to the pilot signal line in a state where the switching element is maintained in OFF state as the second diagnosis process.

(10) In the electronic control unit described in any one of (7) to (9) above, the processor may perform the second diagnosis process after performing the first diagnosis process when the charging cable is not connected to the vehicle.

BRIEF DESCRIPTION OF THE DRAWINGS

FIG. 3 is a timing diagram illustrating a charging operation of the vehicle charging system.

DETAILED DESCRIPTION OF THE INVENTION

Hereinafter, an embodiment of the invention will be described in detail with reference to the accompanying drawings.

Figure 1:
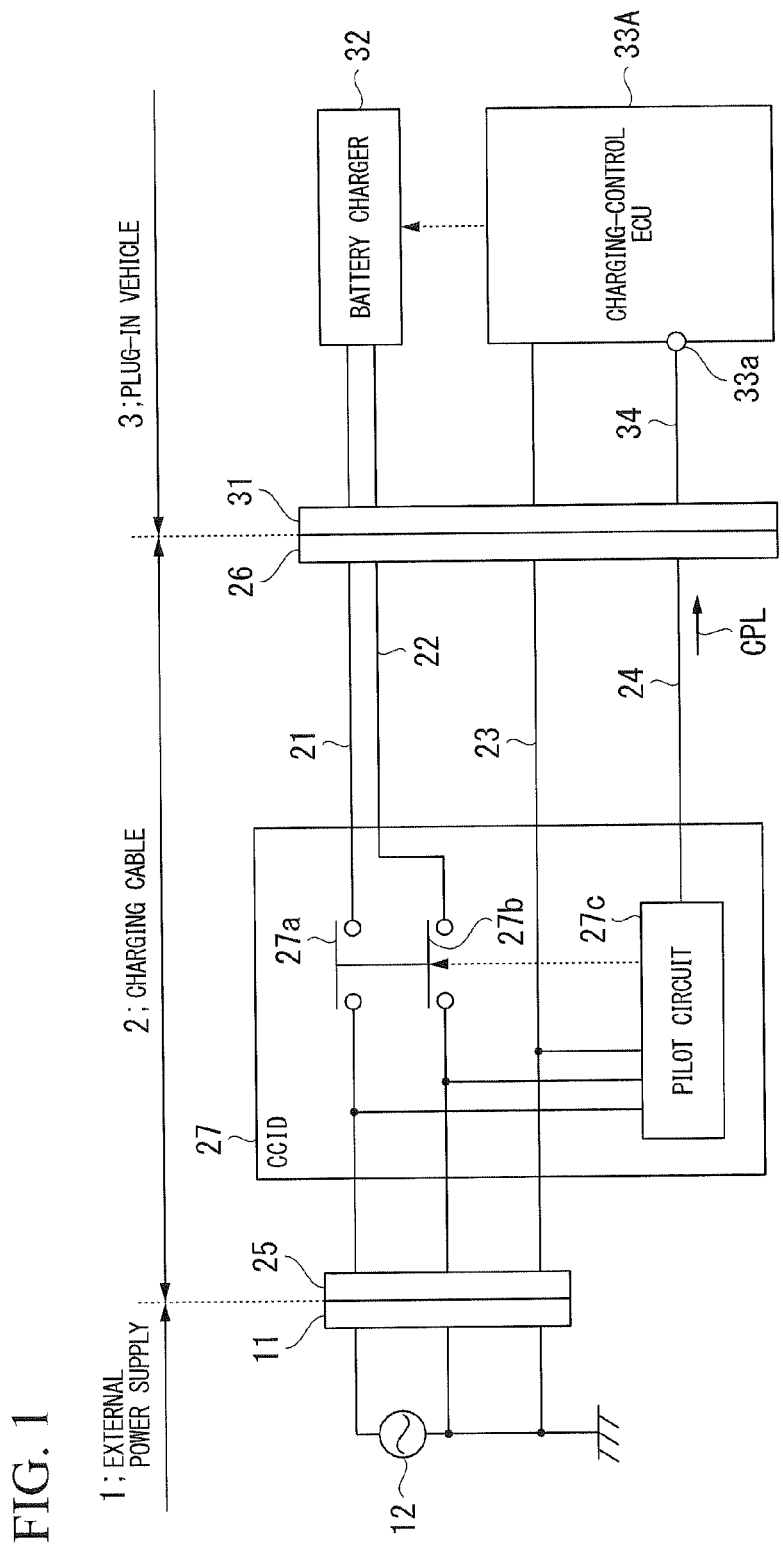
FIG. 1 is a schematic diagram illustrating the configuration of a vehicle charging system according to a first embodiment of the invention.

A first embodiment of the invention will be first described. FIG. 1 is a schematic diagram illustrating the configuration of a vehicle charging system according to a first embodiment of the invention. As shown in FIG. 1, the vehicle charging system according to the first embodiment includes an external power supply 1, a charging cable 2, and a plug-in vehicle 3. The external power supply 1 includes a power receptacle 11 with a ground terminal disposed, for example, in a house and an AC power supply (commercial power supply) 12 supplying single-phase AC power to the power receptacle 11.

The charging cable 2 includes two power supply lines 21 and 22, a ground line 23, a pilot line 24, a plug 25, and a cable-side coupler 26, and a CCID 27. In each of the power supply lines 21 and 22 and the ground line 23, an end thereof is connected to the plug 25 and the other end thereof is connected to the cable-side coupler 26. An end of the pilot line 24 is connected to the CCID 27 (specifically, a pilot circuit 27c) and the other end thereof is connected to the cable-side coupler 26.

By connecting the plug 25 to the power receptacle 11, one end of each of the power supply lines 21 and 22 is connected to the AC power supply 12 and one end of the ground line 23 is connected to the ground of the external power supply 1. By connecting the cable-side coupler 26 to a vehicle-side coupler 31 of the plug-in vehicle 3, the other end of each of the power supply lines 21 and 22 is connected to a battery charger 32 of the plug-in vehicle 3 and the other end of each of the ground line 23 and the pilot line 24 is connected to a charging-control ECU 33A of the plug-in vehicle 3.

The CCID 27 is a control unit that is disposed in the middle of the power supply lines 21 and 22 and the ground line 23, and includes relays 27a and 27b disposed in the middle of the power supply lines 21 and 22 and a pilot circuit 27c transmitting a pilot signal CPL to the charging-control ECU 33A of the plug-in vehicle 3 via the pilot line 24 and controlling ON and OFF states of the relays 27a and 27b. The pilot circuit 27c is connected to the power supply lines 21 and 22 and the ground line 23 and is supplied with a source voltage from the power supply lines 21 and 22 and with a ground voltage from the ground line 23.

The plug-in vehicle 3 is a vehicle which can be charged with the external power supply 1, such as an electric car or a plug-in hybrid car, and includes a vehicle-side coupler 31, a battery charger 32, and a charging-control ECU 33A. By connecting the cable-side coupler 26 of the charging cable 2 to the vehicle-side coupler 31, the power supply lines 21 and 22 are connected to the battery charger 32, and the ground line 23 and the pilot line 24 are connected to the charging-control ECU 33A.

The battery charger 32 is a charging circuit that converts single-phase AC power supplied from the external power supply 1 via the charging cable 2 (the power supply lines 21 and 22) into DC power under the control of the charging-control ECU 33A and that charges a driving battery (not shown) mounted on the plug-in vehicle 3 with the DC power. The charging-control ECU 33A is an electronic control unit that receives a pilot signal CPL via the charging cable 2 before being supplied with the power when the plug-in vehicle 3 is connected to the external power supply 1 via the charging cable 2 and that performs a process necessary for the charging control of the driving battery based on the pilot signal CPL.

The charging-control ECU 33A includes a pilot signal input terminal 33a connected to a pilot signal line 34 extending from the vehicle-side coupler 31 (the charging cable connector) disposed in the plug-in vehicle 3 and used for communication of a pilot signal CPL.

Figure 2:
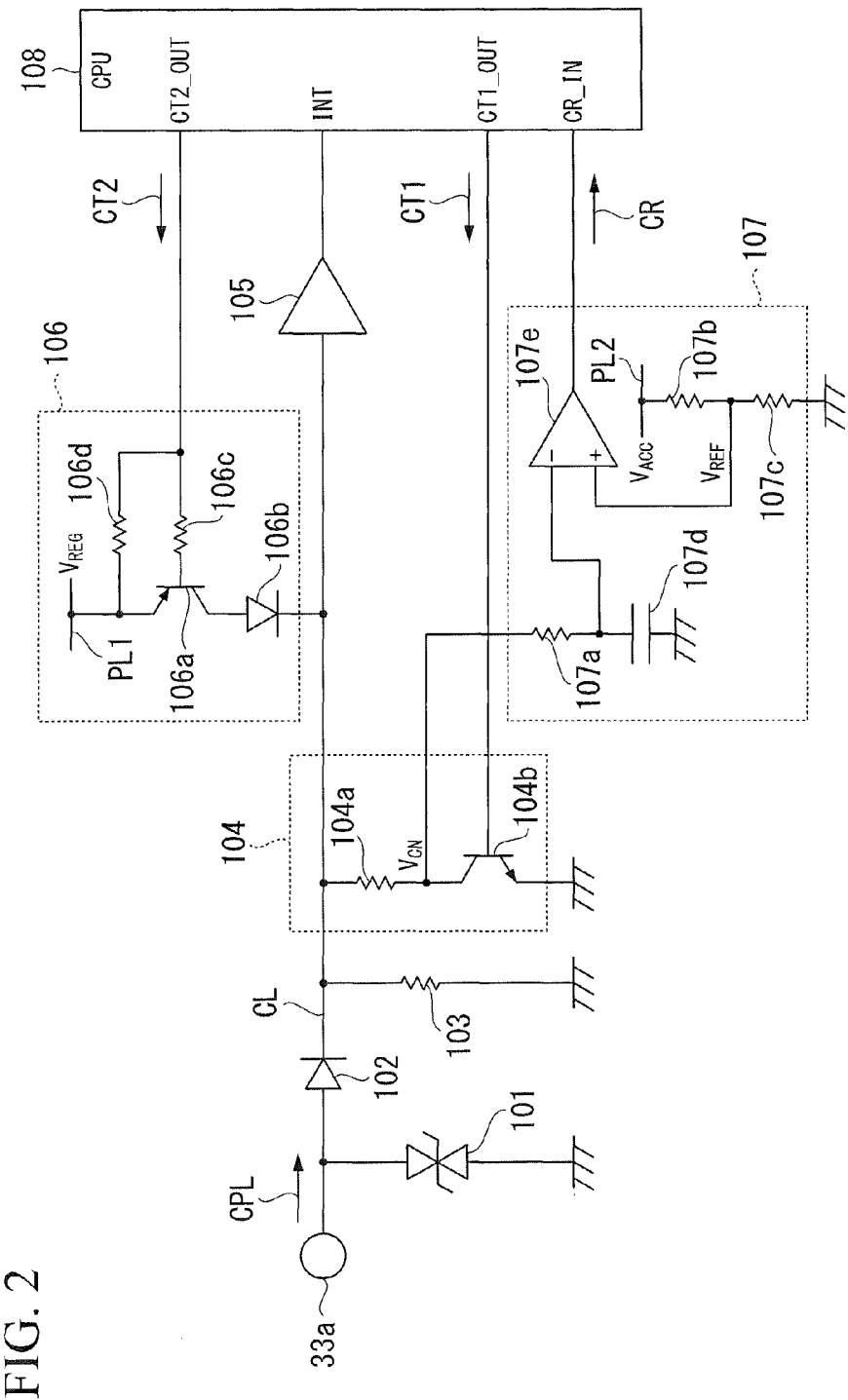
FIG. 2 is a diagram illustrating the internal configuration of a charging-control ECU 33A according to the first embodiment.

FIG. 2 is a diagram illustrating the internal configuration of the charging-control ECU 33A according to the first embodiment. As shown in FIG. 2, the charging-control ECU 33A includes an avalanche diode 101, a first diode 102, a first pull-down resistor 103, a pilot voltage setting circuit 104, an input buffer 105, a first diagnosis voltage supply circuit 106, an abnormality diagnosis circuit 107, and a CPU 108.

The avalanche diode 101 has one end connected to the pilot signal input terminal 33a and the other end connected to the ground and serves to hold the voltage of the pilot signal CPL (the voltage between the pilot signal input terminal 33a and the ground) input via the pilot signal input terminal 33a to be V1 (for example, 12 V) or lower.

The first diode 102 has an anode terminal connected to the pilot signal input terminal 33a and a cathode terminal connected to one end of the first pull-down resistor 103 and serves to pass only a positive signal of the pilot signal CPL. The first pull-down resistor 103 has one end connected to the cathode terminal of the first diode 102 and the other end connected to the ground and serves to change the positive voltage of the pilot signal CPL (that is, the voltage between the cathode terminal of the first diode 102 and the ground) from V1 to V2 (for example, 9 V).

The pilot voltage setting circuit 104 is a circuit that changes the positive voltage of the pilot signal CPL in a stepwise manner (for example, changes the voltage from V2 to V3 (for example, 6 V)) under the control of the CPU 108. The pilot voltage setting circuit 104 includes a second pull-down resistor 104a and a first switching element 104b, for example, which is an npn-type transistor.

In the pilot voltage setting circuit 104, one end of the second pull-down resistor 104a is connected to the cathode terminal of the first diode 102 (is connected to a control line CL extending from the pilot signal input terminal 33a to the input buffer 105) and the other end thereof is connected to the collector terminal of the first switching element 104b.

Here, the control line CL is a line for transmitting a pilot signal CPL to the CPU 108 in the charging-control ECU 33A and is connected to the pilot signal line 34 connecting the vehicle-side coupler 31 to the charging-control ECU 33A with the pilot signal input terminal 33a therebetween.

The collector terminal of the first switching element 104b is connected to the other end of the first pull-down resistor 104a, the emitter terminal thereof is connected to the ground, and the base terminal thereof is connected to a first control signal output port CT1_OUT of the CPU 108. The first switching element 104b is switched between ON and OFF states based on a first control signal CT1 output from the first control signal output port CT1_OUT of the CPU 108 to the base terminal thereof.

In the pilot voltage setting circuit 104 having this configuration, when the first switching element 104b is in ON state, the other end of the second pull-down resistor 104a is connected to the ground and the positive voltage of the pilot signal CPL is changed from V2 to V3.

The input buffer 105 is a buffer of which the input terminal is connected to the cathode terminal of the first diode 102 and the output terminal is connected to a pilot signal input port INT of the CPU 108. The pilot signal CPL is input to the pilot signal input port INT of the CPU 108 via the input buffer 105.

The first diagnosis voltage supply circuit 106 is a voltage supply circuit that supplies a first diagnosis voltage for diagnosing the abnormality of the first switching element 104b to the control line CL under the control of the CPU 108 and includes a second switching element 106a which is, for example, a pnp-type transistor, a second diode 106b, and two resistors 106c and 106d.

The emitter terminal of the second switching element 106a is connected to the power supply line PL1, the collector terminal thereof is connected to the control line CL via the second diode 106b, and the base terminal thereof is connected to a second control signal output port CT2_OUT of the CPU 108 via the resistor 106c. The second switching element 106a is switched between ON and OFF states based on a second control signal CT2 output from the second control signal output port CT2_OUT of the CPU 108 to the base terminal thereof.

The charging-control ECU 33A includes a regulator that drops a main source voltage $V_{IGB}$ supplied from a low-voltage battery mounted on the plug-in vehicle 3 independently of a driving battery to generate a sub source voltage $V_{REG}$. A sub source voltage $V_{REG}$ output from the regulator is applied to the power supply line PL1.

The anode terminal of the second diode 106b is connected to the collector terminal of the second switching element 106a and the cathode terminal thereof is connected to the control line CL. One end of the resistor 106c is connected to the base terminal of the second switching element 106a and the other end thereof is connected to the second control signal output port CT2_OUT of the CPU 108. One end of the resistor 106d is connected to the emitter terminal of the second switching element 106a and the other end thereof is connected to the other end of the resistor 106c.

In the first diagnosis voltage supply circuit 106 having this configuration, when the second switching element 106a is in ON state, the power supply line PL1 and the control line CL are electrically connected to each other and the sub source voltage $V_{REG}$ is supplied as the first diagnosis voltage to the control line CL.

The abnormality diagnosis circuit 107 is a circuit that outputs a signal indicating that the comparison result of the voltage $V_{CN}$ of a connection point of the second pull-down resistor 104a and the first switching element 104b in the pilot voltage setting circuit 104 with the reference voltage $V_{REF}$ as the abnormality diagnosis result of the first switching element 104b and includes three resistors 107a, 107b, and 107c, a capacitor 107d, and a comparator 107e.

One end of the resistor 107a is connected to the connection point of the second pull-down resistor 104a and the first switching element 104b in the pilot voltage setting circuit 104 and the other end thereof is connected to one end of the capacitor 107d and the inverting input terminal of the comparator 107e. One end of the capacitor 107d is connected to the other end of the resistor 107a and the inverting input terminal of the comparator 107e and the other end thereof is connected to the ground. The resistor 107a and the capacitor 107d serve as a noise removing filter of the voltage (the connection point voltage $V_{CN}$) input to the inverting input terminal of the comparator 107e.

One end of the resistor 107b is connected to a power supply line PL2 and the other end thereof is connected to one end of the resistor 107c and the non-inverting input terminal of the comparator 107e. One end of the resistor 107c is connected to the other end of the resistor 107b and the non-inverting input terminal of the comparator 107e and the other end thereof is connected to the ground.

The charging-control ECU 33A includes a 5 V regulator that further drops the sub source voltage $V_{REG}$ to generate a sub source voltage $V_{ACC}$ (for example, 5 V) in addition to the above-mentioned regulator. The sub source voltage $V_{ACC}$ output from the 5 V regulator is applied to the power supply line PL2. That is, when the resistance value of the resistor 107b is defined as R1 and the resistance value of the resistor 107c is defined as R2, the reference voltage $V_{REF}$ input to the non-inverting input terminal of the comparator 107e is expressed by $R2 \neq V_{ACC}/(R1+R2)$.

The comparator 107e compares the connection point voltage $V_{CN}$ input to the inverting input terminal with the reference voltage $V_{REF}$ input to the non-inverting input terminal and outputs a signal (diagnosis result signal) CR indicating the comparison result as the abnormality diagnosis result of the first switching element 104b to a diagnosis result signal input port CR_IN of the CPU 108. Specifically, the comparator 107e outputs the diagnosis result signal CR of a high level when the connection point voltage $V_{CN}$ is lower than the reference voltage $V_{REF}$, and outputs the diagnosis result signal CR of a low level when the connection point voltage $V_{CN}$ is higher than or equal to the reference voltage $V_{REF}$.

The CPU 108 is a processor that performs a process necessary for the charging control based on the pilot signal CPL input to the pilot signal input port INT via the input buffer 105, and controls the pilot voltage setting circuit 104 (outputs the first control signal CT1) to change the voltage of the pilot signal CPL in a stepwise manner.

Although the details thereof will be described later, the CPU 108 has a function of determining whether or not the first switching element 104b is abnormal based on the output signal (that is, the diagnosis result signal CR) of the abnormality diagnosis circuit 107 obtained when turning on and off the first switching element 104b while controlling the first diagnosis voltage supply circuit 106 (the second switching element 106a) to supply the first diagnosis voltage (that is, the sub source voltage $V_{REG}$) to the control line CL as an abnormality diagnosis process (the first diagnosis process) of the first switching element 104b.

The operation of the vehicle charging system having the above-mentioned configuration will be described below with reference to the timing diagram of FIG. 3.

First, at time t1 in FIG. 3, when the plug 25 of the charging cable 2 is connected to the power receptacle 11 of the external power supply 1, the pilot circuit 27c of the CCID 27 is supplied with power from the AC power supply 12 via the power supply lines 21 and 22, is started up, and outputs the pilot signal CPL of a voltage value V1 (12 V) via the pilot line 24. At this time point, the relays 27a and 27b of the CCID 27 are in OFF state and the CPU 108 of the charging-control ECU 33A is in a sleep state.

As shown in FIG. 3, when the CPU 108 is in the sleep state, the first control signal CT1 output from the CPU 108 is at a low level. Accordingly, the first switching element 104b of the pilot voltage setting circuit 104 is in OFF state.

Subsequently, at time t2 in FIG. 3, when the cable-side coupler 26 of the charging cable 2 is connected to the vehicle-side coupler 31 of the plug-in vehicle 3, the pilot signal CPL is input to the pilot signal input terminal 33a of the charging-control ECU 33A, but the positive voltage of the pilot signal CPL (the voltage between the cathode terminal of the first diode 102 and the ground) is changed from V1 to V2 (9 V) by the first pull-down resistor 103.

When the change in voltage of the pilot signal CPL (the change in voltage of the pilot line 24) is detected, the pilot circuit 27c of the CCID 27 determines that the charging cable 2 is connected to the plug-in vehicle 3 and informs the charging-control ECU 33A of the rated current of the power supply facility by transmitting the pilot signal CPL at a duty ratio corresponding to the rated current of the power supply facility (the external power supply 1 and the charging cable 2) at time t3 in FIG. 3.

When the CPU 108 of the charging-control ECU 33A starts up from the sleep state at time t4 in a predetermined time after time t3, the CPU 108 measures the duty ratio of the pilot signal CPL input via the input buffer 105 to acquire the rated current of the power supply facility, then outputs the first control signal CT1 of a high level at time t5 in FIG. 3 to switch the first switching element 104b to ON state, and informs the CCID 27 of the charging cable 2 of the completion of the preparation for charging by changing the voltage of the pilot signal CPL from V2 to V3 (6 V).

When the pilot circuit 27c of the CCID 27 detects that the voltage of the pilot signal CPL (the voltage of the pilot line 24) is changed from V2 to V3, the pilot circuit 27c determines that the preparation for charging of the plug-in vehicle 3 is completed and turns on the relays 27a and 27b for supplying the AC power of the external power supply 1 to the plug-in vehicle 3 (that is, starts the supply of power). Accordingly, the AC power is supplied from the external power supply 1 to the battery charger 32 of the plug-in vehicle 3 via the charging cable 2 (the power supply lines 21 and 22).

The CPU 108 of the charging-control ECU 33A appropriately controls the charging of the driving battery by controlling the battery charger 32 based on the rated current of the power supply facility acquired from the duty ratio of the pilot signal CPL.

In this way, since the stepwise change of the voltage of the pilot signal CPL in the charging-control ECU 33A means that the CCID 27 of the charging cable 2 is informed of the state of the plug-in vehicle 3 side, this is very important in the charging control of the driving battery. When abnormality occurs in the first switching element 104b of the pilot voltage setting circuit 104, the voltage of the pilot signal CPL cannot be changed from V2 to V3 and thus there is a problem in that the supply of power to the plug-in vehicle 3 via the charging cable 2 is not started.

Therefore, it is important to diagnose the abnormality of the first switching element 104b. In the first embodiment, the CPU 108 of the charging-control ECU 33A performs the abnormality diagnosis process (the first diagnosis process) of the first switching element 104b in accordance with the following sequence. Two examples of the first diagnosis will be described below, but any thereof may be employed. The CPU 108 performs the following first diagnosis process when the charging cable 2 is not connected to the plug-in vehicle 3 (for example, when the plug-in vehicle 3 is traveling). This is because the above-mentioned charging operation is interrupted when the first diagnosis process is performed in a state where the charging cable 2 is connected to the plug-in vehicle 3.

Figure 4A:
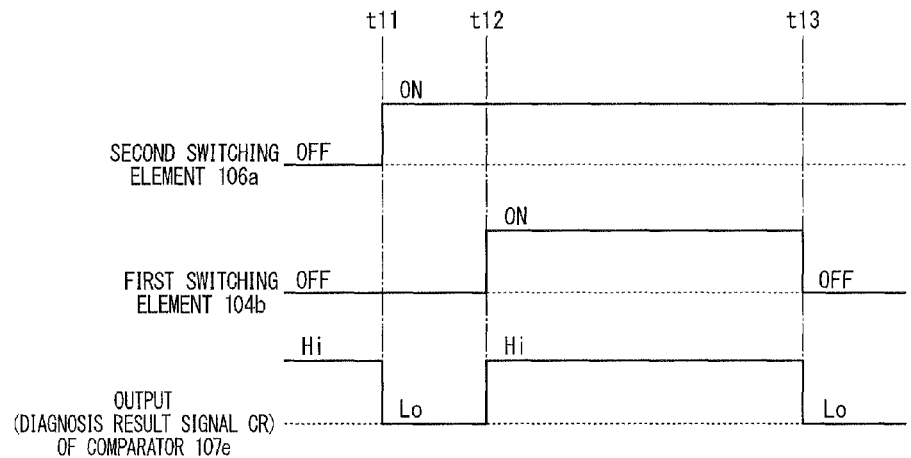
FIG. 4A is a timing diagram illustrating an operation (first example) of the charging-control ECU 33A diagnosing abnormality of a first switching element 104*b*.

A first example of the first diagnosis process performed by the CPU 108 will be described below with reference to the timing diagram of FIG. 4A.

First, the CPU 108 controls the first switching element 104b and the second switching element 106a into OFF state by setting the first control signal CT1 to a low level and setting the second control signal CT2 to a high level as an initial process. At this time, since the connection point voltage $V_{CN}$ is lower than the reference voltage $V_{1F3}$ the diagnosis result signal CR of a high level is output from the comparator 107e.

Subsequently, after time t11 in FIG. 4A, the CPU 108 holds the second switching element 106a in ON state by setting the second control signal CT2 to a low level. Accordingly, after time t11, the first diagnosis voltage of a fixed voltage (the sub source voltage $V_{REG}$) is supplied from the first diagnosis voltage supply circuit 106 to the control line CL.

Subsequently, as described above, the CPU 108 switches the first switching element 104b to ON state by setting the first control signal CT1 to a high level at time t12 while controlling the first diagnosis voltage supply circuit 106 to supply the first diagnosis voltage of a fixed voltage to the control line CL, and then switches the first switching element 104b to OFF state again by setting the first control signal CT1 to a low level at time t13.

Accordingly, when the first switching element 104b is normal, the connection point voltage $V_{CN}$ is higher than the reference voltage $V_{REF}$ in the period of times t11 to t12 and thus the diagnosis result signal CR of a low level is output from the comparator 107e. In the period of times t12 to t13, the connection point voltage $V_{CN}$ is lower than the reference voltage $V_{REF}$ and thus the diagnosis result signal CR of a high level is output from the comparator 107e. After time t13, the connection point voltage $V_{CN}$ is higher than the reference voltage $V_{REF}$ and thus the diagnosis result signal CR of a low level is output from the comparator 107e.

As described above, the CPU 108 determines whether or not the first switching element 104b is abnormal based on the level of the diagnosis result signal CR obtained when turning on and off the first switching element 104b while controlling the first diagnosis voltage supply circuit 106 to supply the first diagnosis voltage of a fixed voltage to the control line CL.

Specifically, the CPU 108 determines that the first switching element 104b is normal when the diagnosis result signal CR is at the high level at the time of turning on the first switching element 104b and the diagnosis result signal CR is at the low level at the time of turning off the first switching element 104b in the state where the second switching element 106a is maintained in ON state.

The CPU 108 determines that the first switching element 104b is abnormal (on-fixed malfunction) when the diagnosis result signal CR is at the high level regardless of ON and OFF states of the first switching element 104b in the state where the second switching element 106a is maintained in ON state, and determines that the first switching element 104b is abnormal (off-fixed malfunction) when the diagnosis result signal CR is at the low level regardless of ON and OFF states of the first switching element 104b.

Figure 4B:
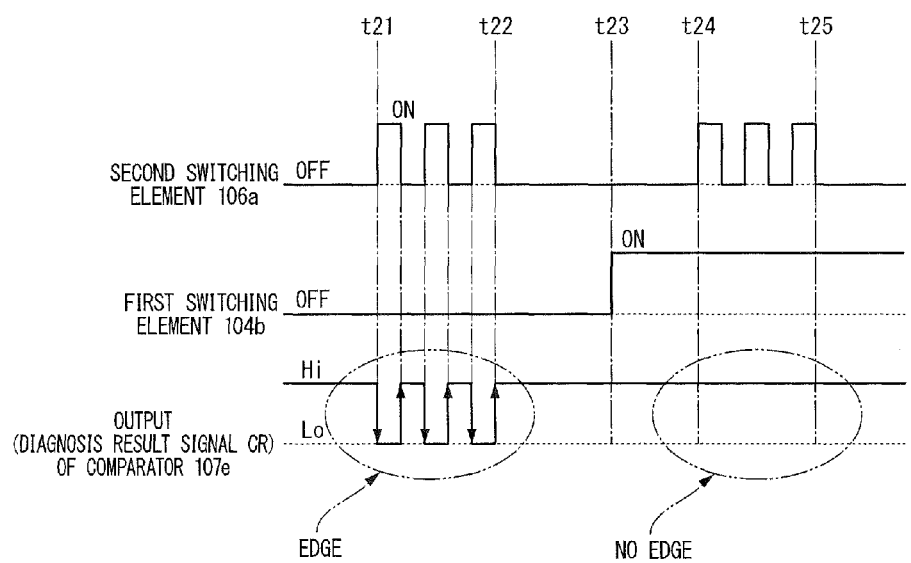
FIG. 4B is a timing diagram illustrating an operation (second example) of the charging-control ECU 33A diagnosing abnormality of the first switching element 104*b*.

A second example of the first diagnosis process performed by the CPU 108 will be described below with reference to the timing diagram of FIG. 4B.

First, similarly to the first example, the CPU 108 controls the first switching element 104b and the second switching element 106a into OFF state as an initial process. At this time, the diagnosis result signal CR of a high level is output from the comparator 107e.

Subsequently, in the period of times t21 to t22 in FIG. 4B, the CPU 108 controls the second switching element 106a in a PWM manner by outputting the pulse-like second control signal CT2 with a fixed frequency (for example, 500 Hz with, for example, a duty ratio of 50%). Accordingly, in the period of times t21 to t22, the pulse-like first diagnosis voltage with a fixed frequency (of which the maximum value is equal to the sub source voltage $V_{REG}$) is supplied from the first diagnosis voltage supply circuit 106 to the control line CL.

In the period of times t21 to t22, when the first switching element 104b is normal (when it is normally turned off), the connection point voltage $V_{CN}$ is higher than or lower than the reference voltage $V_{REF}$ at the same frequency as the first diagnosis voltage and thus the diagnosis result signal CR output from the comparator 107e is switched between a high level and a low level at the same frequency as the first diagnosis voltage.

That is, when the first switching element 104b is normal, an edge is generated in the diagnosis result signal CR.

Subsequently, the CPU 108 switches the first switching element 104b to ON state by setting the first control signal CT1 to a high level at time t23, and then controls the second switching element 106a in the PWM manner by outputting the pulse-like second control signal CT2 with a fixed frequency again in the period of times t24 to t25. Accordingly, similarly to the period of times t21 to t22, in the period of times t24 to t25, the pulse-like first diagnosis voltage with a fixed frequency is supplied from the first diagnosis voltage supply circuit 106 to the control line CL.

In the period of times t24 to t25, when the first switching element 104b is normal (when it is normally turned on), the connection point voltage $V_{CN}$ is always lower than the reference voltage $V_{REF}$ and thus the diagnosis result signal CR output from the comparator 107e is held at the high level. That is, when the first switching element 104b is normal, an edge is not generated in the diagnosis result signal CR.

The CPU 108 determines whether or not the first switching element 104b is abnormal based on the edge of the diagnosis result signal CR obtained when turning on and off the first switching element 104b while controlling the first diagnosis voltage supply circuit 106 to supply the pulse-like first diagnosis voltage with a fixed frequency to the control line CL.

Specifically, the CPU 108 determines that the first switching element 104b is normal when the edge of the diagnosis result signal CR is detected at the time of turning off the first switching element 104b while controlling the second switching element 106a in a PWM manner, and determines that the first switching element 104b is abnormal (on-fixed malfunction) when an edge of the diagnosis result signal CR is not detected.

The CPU 108 determines that the first switching element 104b is normal when an edge of the diagnosis result signal CR is not detected at the time of turning on the first switching element 104b while controlling the second switching element 106a in a PWM manner, and determines that the first switching element 104b is abnormal (off-fixed malfunction) when an edge of the diagnosis result signal CR is detected.

As described above, according to the first embodiment, it is determined whether or not the first switching element 104b is abnormal based on the output signal (the diagnosis result signal CR) of the abnormality diagnosis circuit 107 obtained when turning on and off the first switching element 104b of the pilot voltage setting circuit 104 while controlling the first diagnosis voltage supply circuit 106 to supply the first diagnosis voltage to the control line CL, it is possible to diagnose the abnormality of the first switching element 104b disposed in the pilot voltage setting circuit 104 for changing the pilot signal CPL in a stepwise manner.

The first embodiment employs the configuration in which the voltage of the pilot signal CPL is automatically changed from V1 to V2 at the time point at which the charging cable 2 is connected to the plug-in vehicle 3 (at time t2 in FIG. 3). However, the invention is not limited to this configuration, and may employ a configuration in which the CPU 108 is started up at the time at which the charging cable 2 is connected to the plug-in vehicle 3, that is, when the pilot signal CPL of a pilot value V1 is input to the charging-control ECU 33A, and the voltage of the pilot signal CPL is changed from V1 to V2 under the control of the CPU 108.

A second embodiment of the invention will be described below.

Figure 5:
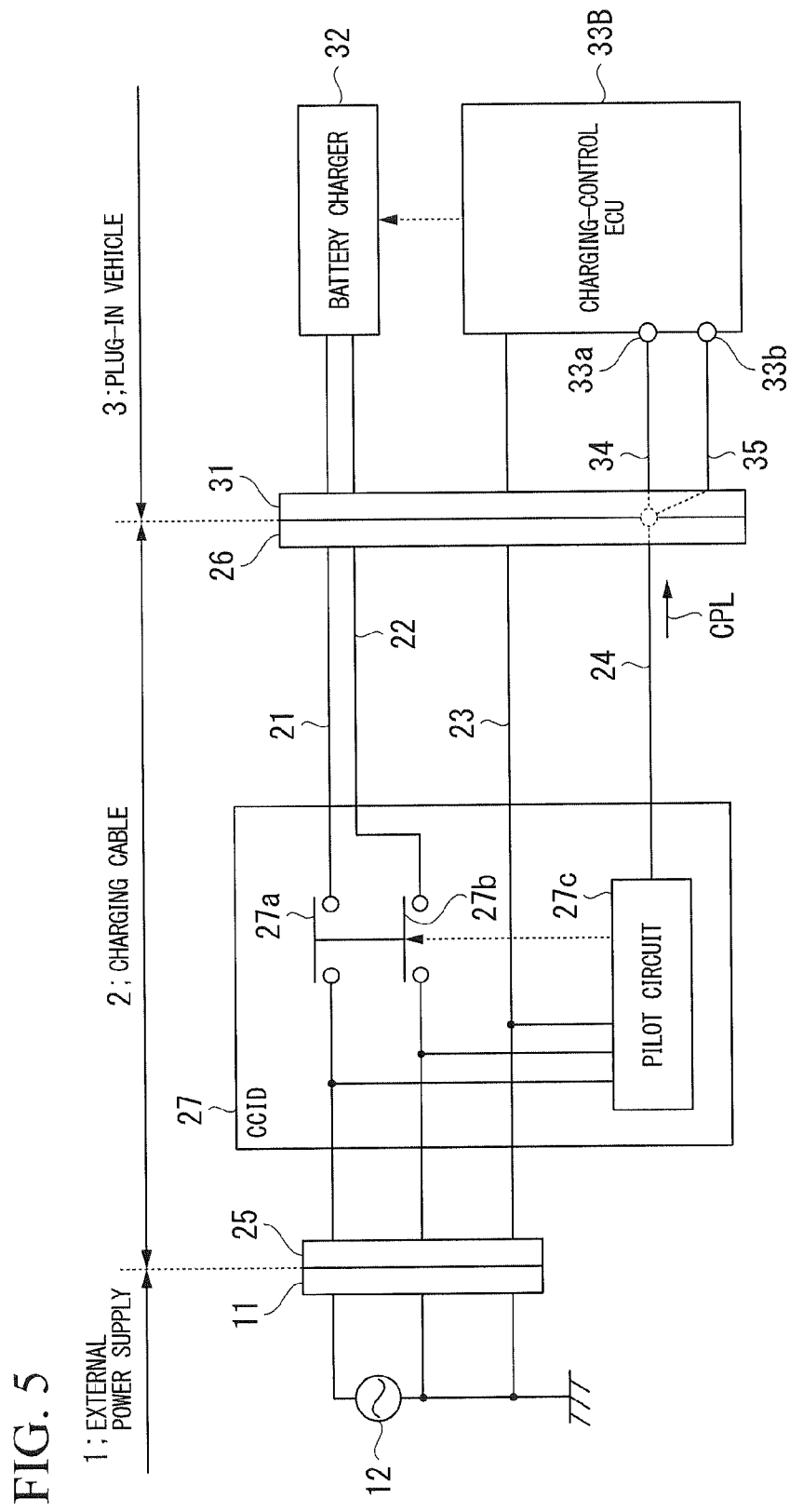
FIG. 5 is a schematic diagram illustrating the configuration of a vehicle charging system according to a second embodiment of the invention.

FIG. 5 is a schematic diagram illustrating the configuration of a vehicle charging system according to a second embodiment of the invention. As can be seen from the comparison of FIG. 5 with FIG. 1, the vehicle charging system according to the second embodiment is different from that of the first embodiment, in that the plug-in vehicle 3 includes a charging-control ECU 33B different from the charging-control ECU 33A according to the first embodiment. That is, the elements other than the charging-control ECU 33B in the vehicle charging system according to the second embodiment are the same as in the first embodiment and the elements other than the charging-control ECU 33B will be referenced by the same reference numerals as in the first embodiment for the purpose of convenience of explanation and descriptions thereof will not be repeated below.

The charging-control ECU 33B according to the second embodiment is an electronic control unit that receives a pilot signal CPL from the charging cable 2 before being supplied with power and that controls the charging of a driving battery based on the pilot signal CPL, when the plug-in vehicle 3 is connected to the external power supply 1 via the charging cable 2.

The charging-control ECU 33B includes a pilot signal input terminal 33a extending from the vehicle-side coupler 31 (the charging cable connector) disposed in the plug-in vehicle 3 and connected to a pilot signal line 34 used for transmission of the pilot signal CPL and a diagnosis voltage output terminal 33b extending from the same vehicle-side coupler 31 and connected to an abnormality diagnosis line 35 connected to the pilot signal line 34 in the vehicle-side coupler 31.

Figure 6:
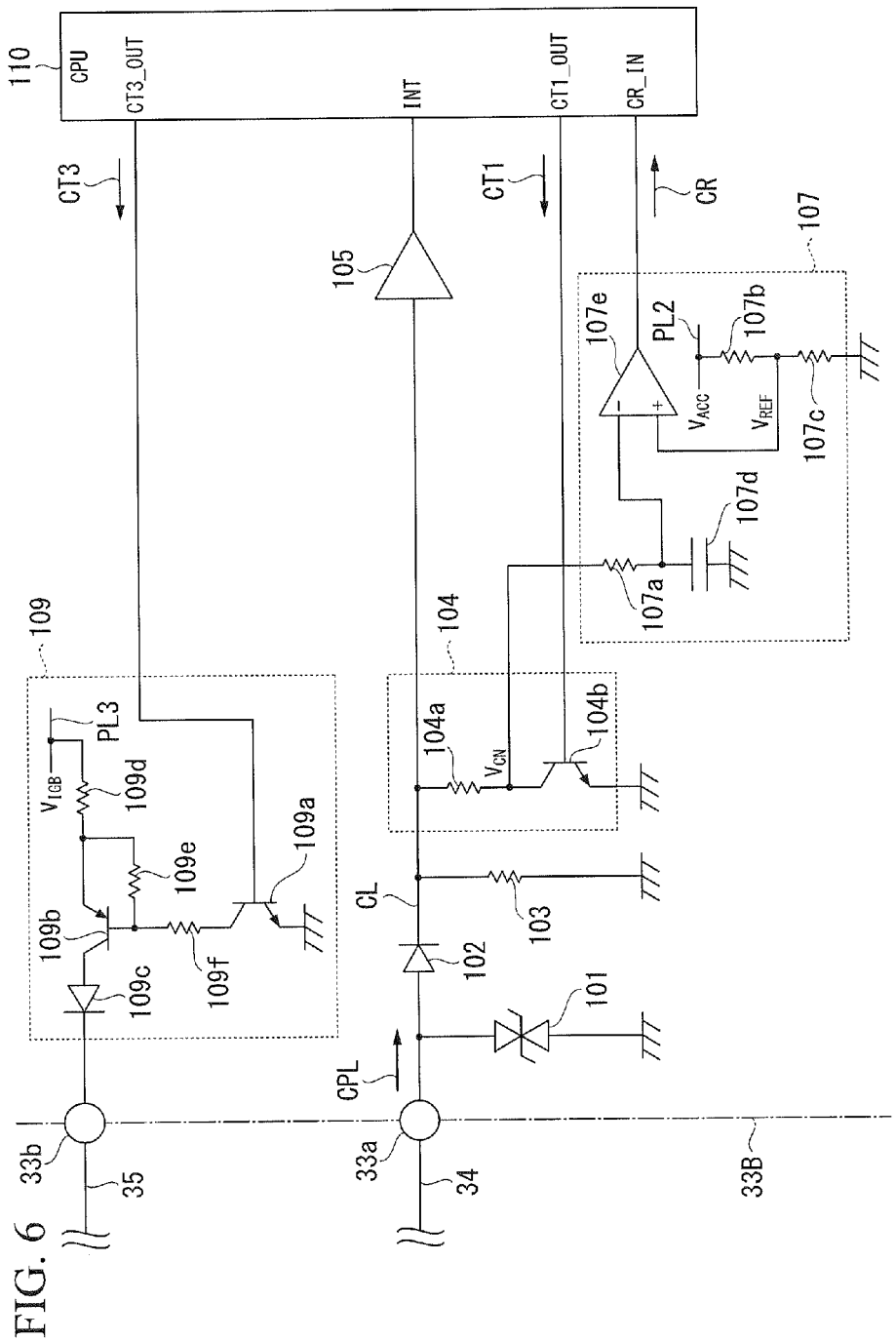
FIG. 6 is a diagram illustrating the internal configuration of a charging-control ECU 33B according to the second embodiment.

FIG. 6 is a diagram illustrating the internal configuration of the charging-control ECU 33B according to the second embodiment. As can be seen from the comparison of FIG. 6 with FIG. 2, the charging-control ECU 33B according to the second embodiment is different from that of the first embodiment, in that a second diagnosis voltage supply circuit 109 having a new circuit configuration is provided instead of the first diagnosis voltage supply circuit 106 and a CPU 110 having a new function is provided instead of the CPU 108.

That is, since an avalanche diode 101, a first diode 102, a first pull-down resistor 103, a pilot voltage setting circuit 104, an input buffer 105, and an abnormality diagnosis circuit 107 in the charging-control ECU 33B of the second embodiment are the same as those in the first embodiment, these elements will be referenced by the same reference numerals as in the first embodiment for the purpose of convenient explanation and will not be described again here.

The second diagnosis voltage supply circuit 109 is a voltage supply circuit supplying a second diagnosis voltage for diagnosing abnormality to the pilot signal line 34 via the diagnosis voltage output terminal 33b and the abnormality diagnosis line 35 under the control of the CPU 110 and includes a third switching element 109a which is, for example, an npn-type transistor, a fourth switching element 109b which is a pnp-type transistor, a third diode 109c, and three resistors 109d, 109e, and 109f.

The collector terminal of the third switching element 109a is connected to the base terminal of the fourth switching element 109b via the resistor 109f, the emitter terminal thereof is connected to the ground, and the base terminal thereof is connected to a third control signal output port CT3_OUT of the CPU 110. The third switching element 109a is switched between ON and OFF states based on a third control signal CT3 output from the third control signal output port CT3_OUT of the CPU 110 to the base terminal thereof.

The collector terminal of the fourth switching element 109b is connected to the diagnosis voltage output terminal 33b via the third diode 109c, the emitter terminal thereof is connected to the power supply line PL3 via the resistor 109d, and the base terminal thereof is connected to the collector terminal of the third switching element 109a via the resistor 109f. The charging-control ECU 33B is supplied with a main source voltage $V_{IGB}$ from a low-voltage battery mounted on the plug-in vehicle 3 independently of a driving battery and the main source voltage $V_{IGB}$ is applied to the power supply line PL3.

The anode terminal of the third diode 109c is connected to the collector terminal of the fourth switching element 109b and the cathode terminal thereof is connected to the diagnosis voltage output terminal 33b. One end of the resistor 109d is connected to the power supply line PL3 and the other end thereof is connected to the emitter terminal of the fourth switching element 109b. One end of the resistor 109e is connected to the emitter terminal of the fourth switching element 109b and the other end thereof is connected to the base terminal of the fourth switching element 109b. One end of the resistor 109f is connected to the base terminal of the fourth switching element 109b and the other end thereof is connected to the collector terminal of the third switching element 109a.

In the second diagnosis voltage supply circuit 109 having the above-mentioned configuration, when the third switching element 109a is in ON state, the main source voltage $V_{IGB}$ is supplied as the second diagnosis voltage to the pilot signal line 34 via the diagnosis voltage output terminal 33b and the abnormality diagnosis line 35.

The CPU 110 is a processor that performs a process necessary for the charging control and controls the pilot voltage setting circuit 104 (outputs the first control signal CT1 to the first switching element 104b) to change the voltage of the pilot signal CPL in a stepwise manner, based on the pilot signal CPL input to the pilot signal input port INT via the input buffer 105.

Although the details thereof will be described later, the CPU 110 has a function of determining whether or not the pilot signal line 34 is abnormal based on the output signal (that is, the diagnosis result signal CR) of the abnormality diagnosis circuit 107 obtained when controlling the second diagnosis voltage supply circuit 109 to supply the second diagnosis voltage to the pilot signal line 34 in a state where the second switching element 104b in the pilot voltage setting circuit 104 is maintained in OFF state as an abnormality diagnosis process (the second diagnosis process) of the pilot signal line 34.

The operation of the vehicle charging system according to the second embodiment having the above-mentioned configuration is the same as in the first embodiment (see FIG. 3) and thus will not be described again here. When disconnection or earth fault is generated in the pilot signal line 34 connecting the vehicle-side coupler 31 to the charging-control ECU 33B, the pilot signal CPL is not transmitted to the charging-control ECU 33B, thereby not controlling the charging of the driving battery.

Therefore, it is important to diagnose the abnormality of the pilot signal line 34. In the second embodiment, the CPU 110 of the charging-control ECU 33B performs the abnormality diagnosis process (the second diagnosis process) of the pilot signal line 34 in accordance with the following sequence.

Two examples of the second diagnosis process will be described below, but any thereof may be employed. The CPU 110 performs the following second diagnosis process when the charging cable 2 is not connected to the plug-in vehicle 3 (for example, when the plug-in vehicle 3 is traveling). This is because the above-mentioned charging operation is interrupted when the second diagnosis process is performed in a state where the charging cable 2 is connected to the plug-in vehicle 3.

Figure 7A:
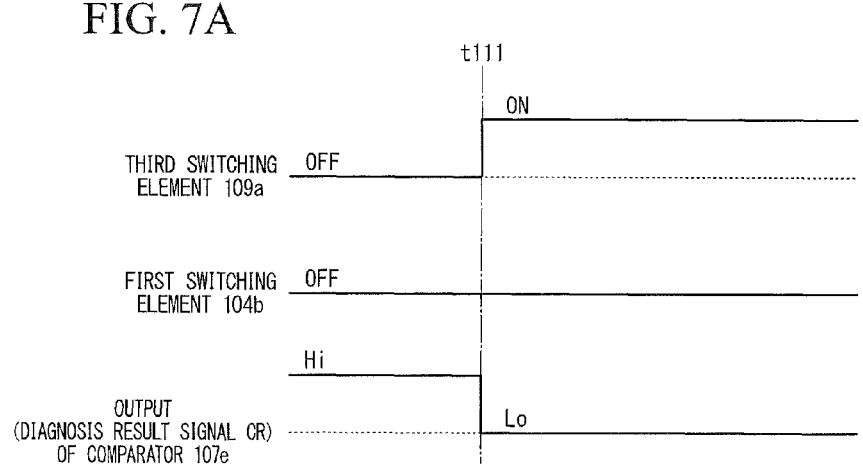
FIG. 7A is a timing diagram illustrating an operation (first example) of the charging-control ECU 33B diagnosing abnormality of a pilot signal line 34.

A first example of the second diagnosis process performed by the CPU 110 will be described below with reference to the timing diagram of FIG. 7A.

First, the CPU 110 controls the first switching element 104b and the third switching element 109a into OFF state by setting the first control signal CT1 and the third control signal CT3 to a low level as an initial process. At this time, since the second diagnosis voltage is not output to the pilot signal line 34 via the abnormality diagnosis line 35 from the second diagnosis voltage supply circuit 109, the connection point voltage $V_{CN}$ is lower than the reference voltage $V_{REF}$ and the diagnosis result signal CR of a high level is output from the comparator 107e.

Subsequently, the CPU 110 switches the third switching element 109a to ON state by setting the third control signal CT3 to a high level after time t111 in FIG. 7A (the first switching element 104b is maintained in OFF state). Accordingly, the second diagnosis voltage of a fixed voltage (the main source voltage $V_{IGB}$) is supplied to the pilot signal line 34 from the second diagnosis voltage supply circuit 109 after time t111. Here, when the pilot signal line 34 is normal (there is no disconnection and no earth fault), the connection point voltage $V_{CN}$ is higher than the reference voltage $V_{REF}$ after time t111 and thus the diagnosis result signal CR of a low level is output from the comparator 107e.

The CPU 110 determines whether or not the pilot signal line 34 is abnormal based on the level of the diagnosis result signal CR obtained when controlling the second diagnosis voltage supply circuit 109 to supply the second diagnosis voltage of a fixed voltage to the pilot signal line 34 in the state where the first switching element 104b is maintained in OFF state as described above.

Specifically, when controlling the second diagnosis voltage supply circuit 109 to supply the second diagnosis voltage of a fixed voltage to the pilot signal line 34 in the state where the first switching element 104b is maintained in OFF state, the CPU 110 determines that the pilot signal line 34 is normal when the diagnosis result signal CR is at a low level, and determines that the pilot signal line 34 is abnormal (there is disconnection or earth fault) when the diagnosis result signal CR is at a high level.

Figure 7B:
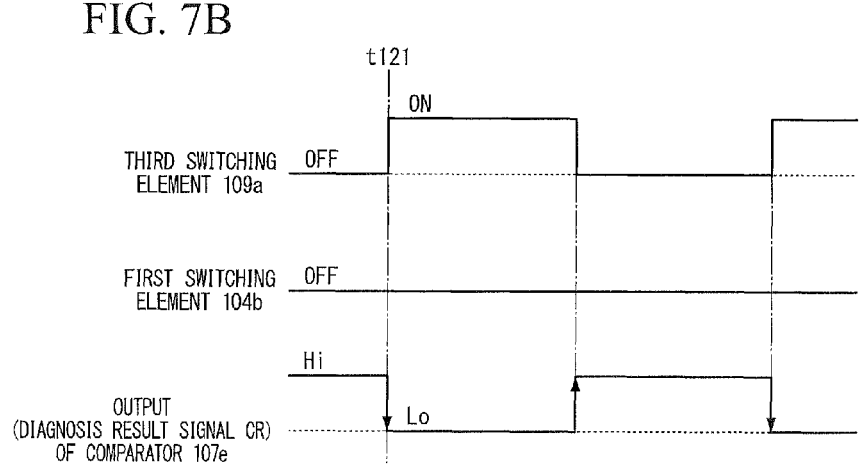
FIG. 7B is a timing diagram illustrating an operation (second example) of the charging-control ECU 33B diagnosing abnormality of the pilot signal line 34.

A second example of the second diagnosis process performed by the CPU 110 will be described below with reference to the timing diagram of FIG. 7B.

First, similarly to the first example, the CPU 110 controls the first switching element 104b and the third switching element 109a into OFF state as an initial process. At this time, the diagnosis result signal CR of a high level is output from the comparator 107e.

Subsequently, the CPU 110 controls the third switching element 109a in a PWM manner by outputting the pulse-like third control signal CT3 with a fixed frequency (for example, 2 Hz with a duty ratio of, for example, 50%) after time t121 in FIG. 7B. Accordingly, after time t121, the pulse-like second diagnosis voltage (of which the maximum value is equal to the main source voltage $V_{IGB}$) having the same frequency and duty ratio as the third control signal CT3 is supplied to the pilot signal line 34 from the second diagnosis voltage supply circuit 109.

When the pilot signal line 34 is normal after time t121, the connection point voltage $V_{CN}$ is higher or lower than the reference voltage $V_{REF}$ at the same frequency as the second diagnosis voltage and thus the diagnosis result signal CR output from the comparator 107e is switched between a high level and a low level at the same frequency as the second diagnosis voltage. That is, when the pilot signal line 34 is normal, an edge is generated in the diagnosis result signal CR.

As described above, the CPU 110 determines whether or not the pilot signal line 34 is abnormal based on the edge of the diagnosis result signal CR obtained when controlling the second diagnosis voltage supply circuit 109 to supply the pulse-like second diagnosis voltage with a predetermined frequency to the pilot signal line 34 in the state where the first switching element 104b is maintained in OFF state.

Specifically, when controlling the second diagnosis voltage supply circuit 109 to supply the second diagnosis voltage with a predetermined frequency to the pilot signal line 34 in the state where the first switching element 104b is maintained in OFF state, the CPU 110 determines that the pilot signal line 34 is normal when an edge of the diagnosis result signal CR is detected, and determines that the pilot signal line 34 is abnormal when an edge of the diagnosis result signal CR is not detected.

As described above, according to the second embodiment, it is determined whether or not the pilot signal line 34 is abnormal based on the diagnosis result signal CR output from the abnormality diagnosis circuit 107 when controlling the second diagnosis voltage supply circuit 109 to supply the second diagnosis voltage to the pilot signal line 34 in the state where the first switching element 104b is maintained in OFF state. Here, the abnormality diagnosis circuit 107 outputs the diagnosis result signal CR indicating the abnormality when disconnection or earth fault is generated in the pilot signal line 34, and it is thus possible to diagnose the abnormality of the pilot signal line 34 as, for example, disconnection or earth fault.

A third embodiment of the invention will be described below.

Figure 8:
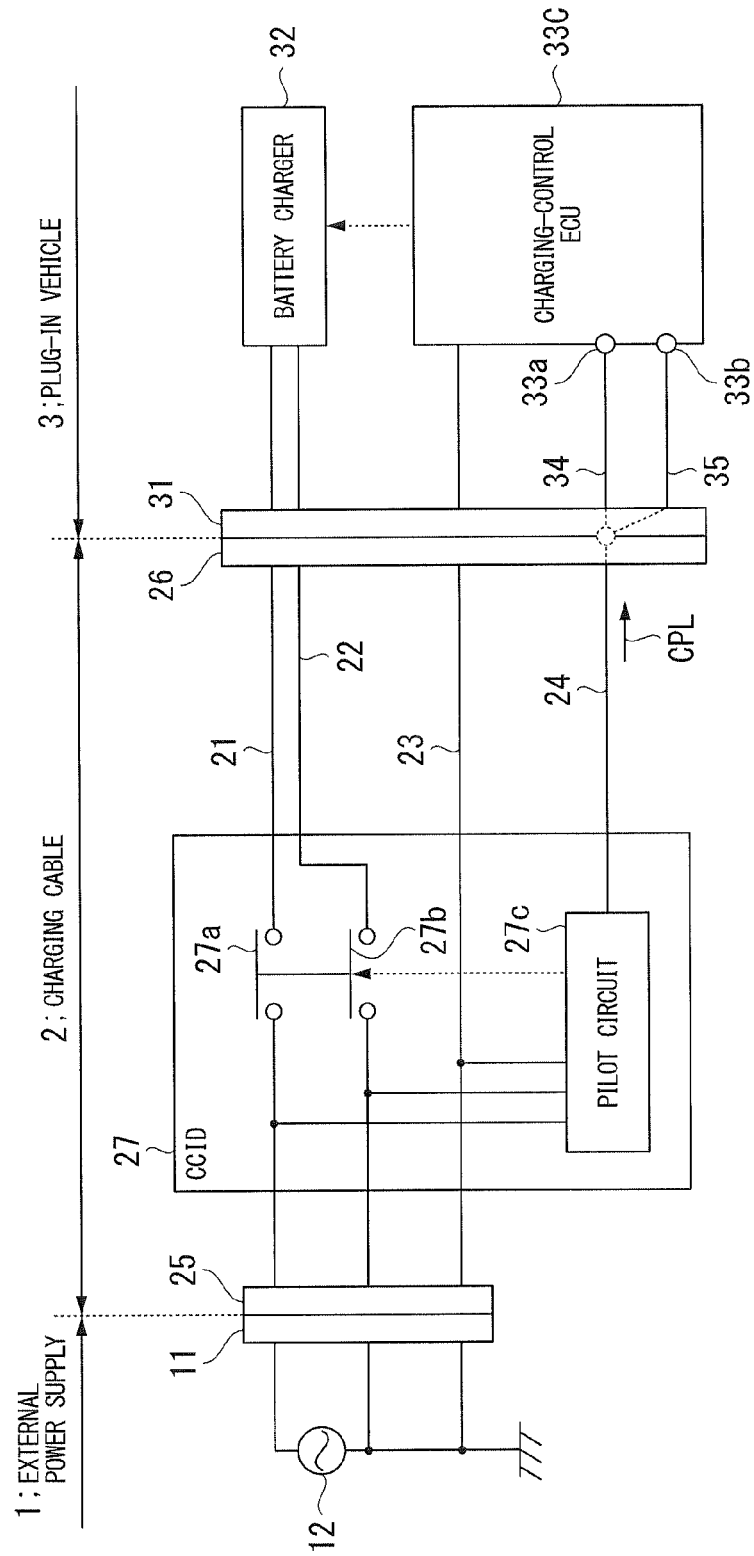
FIG. 8 is a schematic diagram illustrating the configuration of a vehicle charging system according to a third embodiment of the invention.

FIG. 8 is a schematic diagram illustrating the configuration of a vehicle charging system according to a third embodiment of the invention. As can be seen from the comparison of FIG. 8 with FIG. 5, the vehicle charging system according to the third embodiment is different from that of the second embodiment, in that the plug-in vehicle 3 includes a charging-control ECU 33C different from the charging-control ECU 33B according to the second embodiment. That is, the elements other than the charging-control ECU 33C in the vehicle charging system according to the third embodiment are the same as in the second embodiment and the elements other than the charging-control ECU 33C will be referenced with the same reference numerals as in the second embodiment for the purpose of convenient explanation and will not be described again here.

The charging-control ECU 33C according to the third embodiment is an electronic control unit that receives a pilot signal CPL from the charging cable 2 before being supplied with a power and that controls the charging of a driving battery based on the pilot signal CPL, when the plug-in vehicle 3 is connected to the external power supply 1 via the charging cable 2.

Similarly to the charging-control ECU 33B according to the second embodiment, the charging-control ECU 33C includes a pilot signal input terminal 33a extending from the vehicle-side coupler 31 (the charging cable connector) disposed in the plug-in vehicle 3 and connected to a pilot signal line 34 used for transmission of the pilot signal CPL and a diagnosis voltage output terminal 33b extending from the same vehicle-side coupler 31 and connected to an abnormality diagnosis line 35 connected to the pilot signal line 34 in the vehicle-side coupler 31.

Figure 9:
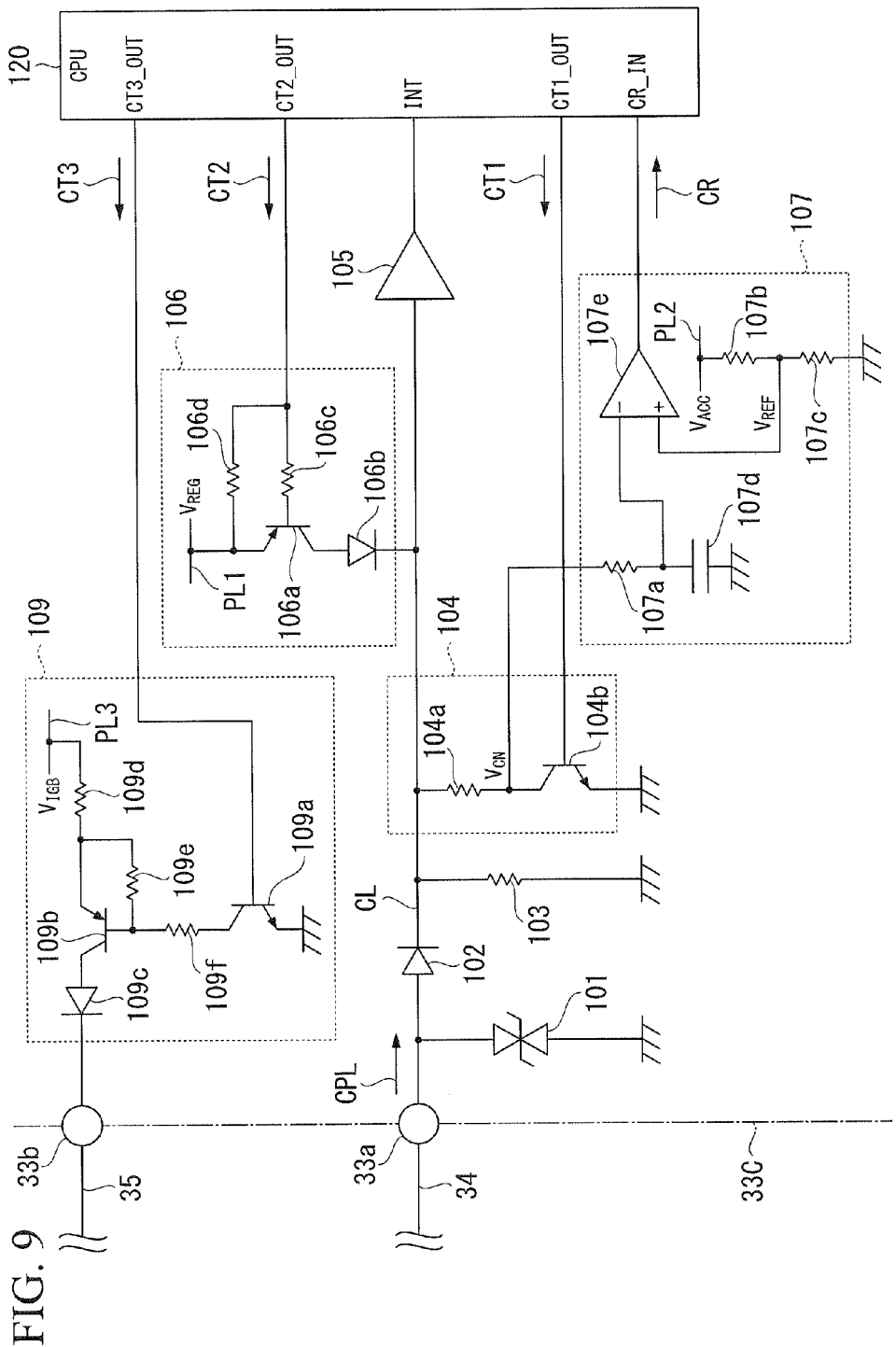
FIG. 9 is a diagram illustrating the internal configuration of a charging-control ECU 33C according to the third embodiment of the invention.

FIG. 9 is a diagram illustrating the internal configuration of the charging-control ECU 33C according to the third embodiment. As can be seen from the comparison of FIG. 9 with FIG. 6, the charging-control ECU 33C according to the third embodiment is different from that of the second embodiment, in that both the first diagnosis voltage supply circuit 106 in the first embodiment and the second diagnosis voltage supply circuit 109 in the second embodiment are provided as the voltage supply circuit and a CPU 120 having a new function is provided instead of the CPU 110.

That is, since an avalanche diode 101, a first diode 102, a first pull-down resistor 103, a pilot voltage setting circuit 104, an input buffer 105, and an abnormality diagnosis circuit 107 in the charging-control ECU 33C according to the third embodiment are the same as those in the second embodiment, these elements will be referenced by the same reference numerals as in the second embodiment for the purpose of convenient explanation and will not be described again here.

The circuit configuration of the first diagnosis voltage supply circuit 106 is the same as in the first embodiment. That is, the first diagnosis voltage supply circuit 106 supplies the first diagnosis voltage for diagnosing abnormality of the first switching element 104b to the control line CL based on the second control signal CT2 output from the second control signal output port CT2_OUT of the CPU 120. The circuit configuration of the second diagnosis voltage supply circuit 109 is the same as in the second embodiment. That is, the second diagnosis voltage supply circuit 109 supplies the second diagnosis voltage for diagnosing abnormality to the pilot signal line 34 via the diagnosis voltage output terminal 33b and the abnormality diagnosis line 35 based on the third control signal CT3 output from the third control signal output port CT3_OUT of the CPU 120.

The CPU 120 is a processor that performs a process necessary for the charging control and controls the pilot voltage setting circuit 104 (outputs the first control signal CT1 to the first switching element 104b) to change the voltage of the pilot signal CPL in a stepwise manner, based on the pilot signal CPL input to the pilot signal input port INT via the input buffer 105.

Although the details thereof will be described later, the CPU 120 has a function of first determining whether or not the first switching element 104b is abnormal based on the output signal (the diagnosis result signal CR) of the abnormality diagnosis circuit 107 obtained when turning on and off the first switching element 104b while controlling the first diagnosis voltage supply circuit 106 to supply the first diagnosis voltage to the control line CL as the abnormality diagnosis process (the first diagnosis process) of the first switching element 104b, and then determining whether or not the pilot signal line 34 is abnormal based on the output signal of the abnormality diagnosis circuit 107 obtained when controlling the second diagnosis voltage supply circuit 109 to supply the second diagnosis voltage to the pilot signal line 34 in a state where the first switching element 104b is maintained in OFF state as the abnormality diagnosis process (the second diagnosis process) of the pilot signal line 34.

The charging operation of the vehicle charging system according to the third embodiment having the above-mentioned configuration is the same as in the first embodiment (see FIG. 3) and thus will not be repeated, but it is important to diagnose the abnormality of the first switching element 104b and the pilot signal line 34 as described in the first and second embodiments.

In the third embodiment, the CPU 120 of the charging-control ECU 33C first performs the abnormality diagnosis process (the first diagnosis process) of the first switching element 104b and then performs the abnormality diagnosis process (the second diagnosis process) of the pilot signal line 34 in accordance with the following diagnosis sequence. Two examples of the diagnosis process will be described below, but any thereof may be employed. The CPU 120 performs the following diagnosis processes when the charging cable 2 is not connected to the plug-in vehicle 3 (for example, when the plug-in vehicle 3 is traveling). This is because the above-mentioned charging operation is interrupted when the diagnosis processes are performed in a state where the charging cable 2 is connected to the plug-in vehicle 3.

In the diagnosis sequence, it is important to first perform the abnormality diagnosis process for the first switching element 104b and then perform the abnormality diagnosis process for the pilot signal line 34. As described below, this is because it is necessary to perform the abnormality diagnosis process for the pilot signal line 34 in the state where the first switching element 104b is maintained in OFF state and thus the abnormality of the pilot signal line 34 cannot be correctly diagnosed when the first switching element 104b is out of order. That is, after it is guaranteed that the first switching element 104b is normal by diagnosing the abnormality of the first switching element 104b, the abnormality of the pilot signal line 34 is diagnosed.

A first example of the diagnosis processes performed by the CPU 120 will be described below with reference to the timing diagram of FIG. 10A.

First, the CPU 120 controls the first switching element 104b, the second switching element 106a, and the third switching element 109a into OFF state by setting the first control signal CT1 and the third control signal CT3 to a low level and setting the second control signal CT2 to a high level as an initial process. At this time, since the connection point voltage $V_{CN}$ is lower than the reference voltage $V_{REF}$, the diagnosis result signal CR of a high level is output from the comparator 107e.

Subsequently, the CPU 120 holds the second switching element 106a in ON state by setting the second control signal CT2 to the low level in the period of times t211 to t214 in FIG. 10A. Accordingly, in the period of times t211 to t214, the first diagnosis voltage of a fixed voltage (the sub source voltage $V_{REG}$) is supplied from the first diagnosis voltage supply circuit 106 to the control line CL.

Subsequently, the CPU 120 switches the first switching element 104b to ON state by setting the first control signal CT1 to a high level at time t212 while controlling the first diagnosis voltage supply circuit 106 to supply the first diagnosis voltage of a fixed voltage to the control line CL, and then switches the first switching element 104b to OFF state again by setting the first control signal CT1 to a low level at time t213.

Accordingly, when the first switching element 104b is normal, the connection point voltage $V_{CN}$ is higher than the reference voltage $V_{REF}$ in the period of times t211 to t212 and thus the diagnosis result signal CR of a low level is output from the comparator 107e. In the period of times t212 to t213, the connection point voltage $V_{CN}$ is lower than the reference voltage $V_{REF}$ and thus the diagnosis result signal CR of a high level is output from the comparator 107e. In the period of times t213 to t214, the connection point voltage $V_{CN}$ is higher than the reference voltage $V_{REF}$ and thus the diagnosis result signal CR of a low level is output from the comparator 107e.

The CPU 120 determines whether or not the first switching element 104b is abnormal based on the level of the diagnosis result signal CR, which is obtained when turning on and off the first switching element 104b while controlling the first diagnosis voltage supply circuit 106 to supply the first diagnosis voltage of a fixed voltage to the control line CL as described above.

Specifically, the CPU 120 determines that the first switching element 104b is normal when the first switching element 104b is in ON state and the diagnosis result signal CR is at a high level at that time and when the first switching element 104b is in OFF state and the diagnosis result signal CR is at a low level at that time, in the state where the second switching element 106a is maintained in ON state.

The CPU 120 determines that the first switching element 104b is abnormal (on-fixed malfunction) when the diagnosis result signal CR is at a high level regardless of ON and OFF states of the first switching element 104b, and determines that the first switching element 104b is abnormal (off-fixed malfunction) when the diagnosis result signal CR is at a low level regardless of ON and OFF states of the first switching element 104b, in the state where the second switching element 106a is maintained in ON state.

Figure 10A:
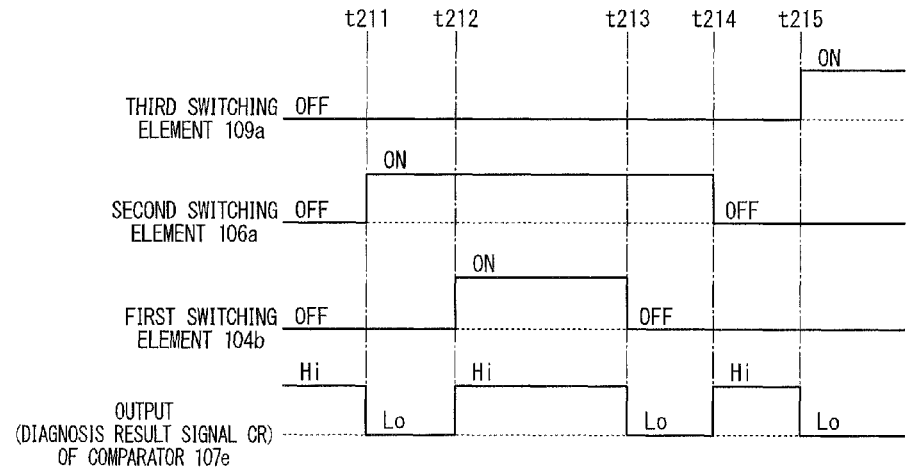
FIG. 10A is a timing diagram illustrating an operation (first example) of the charging-control ECU 33C diagnosing abnormality of a first switching element 104*b* and a pilot signal line 34.

The CPU 120 switches the third switching element 109a to ON state by setting the third control signal CT3 to a high level after time t215 in FIG. 10A (where the first switching element 104b and the second switching element 106a are maintained in OFF state). Accordingly, after time t215, the second diagnosis voltage of a fixed voltage diagnosis voltage supply circuit 109. Here, when the pilot signal line 34 is normal (when there is no disconnection and earth fault), the connection point voltage $V_{CN}$ is higher than the reference voltage $V_{REF}$ after time t215 and thus the diagnosis result signal CR of a low level is output from the comparator 107e.

The CPU 120 determines whether or not the pilot signal line 34 is abnormal based on the level of the diagnosis result signal CR, which is obtained when controlling the second diagnosis voltage supply circuit 109 to supply the second diagnosis voltage of a fixed voltage to the pilot signal line 34 in the state where the first switching element 104b is maintained in OFF state as described above.

Specifically, the CPU 120 determines that the pilot signal line 34 is normal when the second diagnosis voltage supply circuit 109 is controlled to supply the second diagnosis voltage of a fixed voltage to the pilot signal line 34 and the diagnosis result signal CR is at a low level at that time, and determines that the pilot signal line 34 is abnormal (there is disconnection or earth fault) when the diagnosis result signal CR is at a high level at that time, in the state where the first switching element 104b is maintained in OFF state.

A second example of the diagnosis processes performed by the CPU 120 will be described below with reference to the timing diagram shown in FIG. 10B.

First, similarly to the first example, the CPU 120 controls the first switching element 104b, the second switching element 106a, and the third switching element 109a into OFF state as an initial process. At this time, the diagnosis result signal CR of a high level is output from the comparator 107e.

Subsequently, the CPU 120 controls the second switching element 106a in a PWM manner by outputting the pulse-like second control signal CT2 with a fixed frequency (for example, 500 Hz with a duty ratio of, for example, 50%) in the period of times t221 to t222 in FIG. 10B. Accordingly, in the period of time t221 to t222, the pulse-like first diagnosis voltage (of which the maximum value is equal to the sub source voltage $V_{REG}$) with a fixed frequency is supplied from the first diagnosis voltage supply circuit 106 to the control line CL.

In the period of times t221 to t222, when the first switching element 104b is normal (when it is normally in OFF state), the connection point voltage $V_{CN}$ is higher or lower than the reference voltage $V_{REF}$ at the same frequency as the first diagnosis voltage and thus the diagnosis result signal CR output from the comparator 107e is switched between a high level and a low level at the same frequency as the first diagnosis voltage. That is, when the first switching element 104b is normal, an edge is generated in the diagnosis result signal CR.

Subsequently, the CPU 120 switches the first switching element 104b to ON state by setting the first control signal CT1 to a high level at time t223, and controls the second switching element 106a in a PWM manner by outputting the pulse-like second control signal CT2 with a fixed frequency again in the period of times t224 to t225. Accordingly, in the period of times t224 to t225, similarly to the period of times t221 to t222, the pulse-like first diagnosis voltage with a fixed frequency is supplied from the first diagnosis voltage supply circuit 106 to the control line CL.

In the period of times t224 to t225, when the first switching element 104b is normal (when it is normally in ON state), the connection point voltage $V_{CN}$ is normally lower than the reference voltage $V_{REF}$ and thus the diagnosis result signal CR output from the comparator 107e is maintained at a high level. That is, when the first switching element 104b is normal, no edge is generated in the diagnosis result signal CR.

The CPU 120 determines whether or not the first switching element 104b is abnormal based on the edge of the diagnosis result signal CR, which is obtained when turning on and off the first switching element 104b while controlling the first diagnosis voltage supply circuit 106 to supply the pulse-like first diagnosis voltage with a fixed frequency to the control line CL as described above.

Specifically, the CPU 120 determines that the first switching element 104b is normal when an edge in the diagnosis result signal CR is detected at the time of turning off the first switching element 104b, and determines that the first switching element 104b is abnormal (on-fixed malfunction) when no edge in the diagnosis result signal CR is detected, while controlling the second switching element 106a in a PWM manner.

The CPU 120 determines that the first switching element 104b is normal when no edge in the diagnosis result signal CR is detected at the time of turning on the first switching element 104b, and determines that the first switching element 104b is abnormal (off-fixed malfunction) when an edge in the diagnosis result signal CR is detected, while controlling the second switching element 106a in a PWM manner.

Figure 10B:
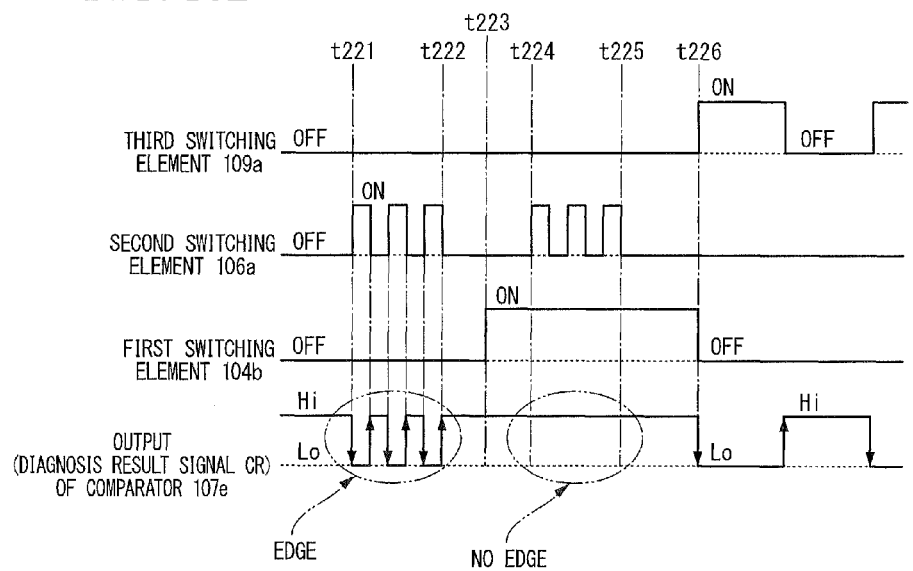
FIG. 10B is a timing diagram illustrating an operation (second example) of the charging-control ECU 33C diagnosing abnormality of the first switching element 104*b* and the pilot signal line 34.

Then, the CPU 120 controls the third switching element 109a in a PWM manner (where the first switching element 104b and the second switching element 106a are maintained in OFF state) by outputting the pulse-like third control signal CT3 with a fixed frequency (for example, 2 Hz with a duty ratio of, for example, 50%) after time t226 in FIG. 10B. Accordingly, after time t226, the pulse-like second diagnosis voltage (of which the maximum value is equal to the main source voltage $V_{IGB}$) with the same frequency and duty ratio as the third control signal CT3 is supplied from the second diagnosis voltage supply circuit 109 to the pilot signal line 34.

After time t226, when the pilot signal line 34 is normal, the connection point voltage $V_{CN}$ is higher or lower than the reference voltage $V_{REF}$ at the same frequency as the second diagnosis voltage and thus the diagnosis result signal CR output from the comparator 107e is switched between a high level and a low level at the same frequency as the second diagnosis voltage. That is, when the pilot signal line 34 is normal, an edge is generated in the diagnosis result signal CR.

The CPU 120 determines whether or not the pilot signal line 34 is abnormal based on the edge of the diagnosis result signal CR, which is obtained when controlling the second diagnosis voltage supply circuit 109 to supply the pulse-like second diagnosis voltage with a fixed frequency to the pilot signal line 34 in the state where the first switching element 104b is maintained in OFF state as described above.

Specifically, the CPU 120 determines that the pilot signal line 34 is normal when the second diagnosis voltage supply circuit 109 is controlled to supply the second diagnosis voltage of a fixed frequency to the pilot signal line 34 and an edge in the diagnosis result signal CR is detected at that time, and determines that the pilot signal line 34 is abnormal when no edge in the diagnosis result signal CR is detected at that time, in the state where the first switching element 104b is maintained in OFF state.

As described above, according to the third embodiment, since it is determined whether or not the first switching element 104b is abnormal based on the diagnosis result signal CR which is obtained when turning on and off the first switching element 104b of the pilot voltage setting circuit 104 while controlling the first diagnosis voltage supply circuit 106 to supply the first diagnosis voltage to the control line CL, it is possible to diagnose the abnormality of the first switching element 104b disposed in the pilot voltage setting circuit 104 used to change the pilot signal CPL in a stepwise manner.

According to the third embodiment, it is determined whether or not the pilot signal line 34 is abnormal based on the diagnosis result signal CR which is obtained when controlling the second diagnosis voltage supply circuit 109 to supply the second diagnosis voltage to the pilot signal line 34 in the state where the first switching element 104b is maintained in OFF state. Here, since the abnormality diagnosis circuit 107 outputs the diagnosis result signal CR indicating the abnormality when a disconnection or earth fault is generated in the pilot signal line 34, it is possible to diagnose the abnormality of the pilot signal line 34, such as, for example, the disconnection and earth fault.

What is claimed is:
1. An electronic control unit that is mounted on a vehicle which is configured to be charged with an external power supply and that receives a pilot signal via a charging cable before being supplied with a power when the vehicle is connected to the external power supply via the charging cable, the electronic control unit comprising:
   a control line that is connected to a pilot signal line connecting a charging cable connector disposed in the vehicle to the electronic control unit;
   a processor that performs a process necessary for a control of charging based on the pilot signal input via the control line;
   a pilot voltage setting circuit that is connected between the control line and a ground and that includes a serial circuit of a pull-down resistor and a switching element controlled by the processor;
   a voltage supply circuit that includes at least one of a first diagnosis voltage supply circuit supplying a first diagnosis voltage to the control line under control of the processor and a second diagnosis voltage supply circuit supplying a second diagnosis voltage to the pilot signal line via an abnormality diagnosis line connected to the pilot signal line at the charging cable connector under control of the processor; and
   an abnormality diagnosis circuit that is connected to the pull-down resistor and the switching element and that outputs an abnormality diagnosis result signal of at least one of the switching element and the pilot signal line to the processor, wherein the processor performs at least one of a first diagnosis process of determining whether or not the switching element is abnormal based on an output signal of the abnormality diagnosis circuit obtained when turning on and off the switching element while controlling the first diagnosis voltage supply circuit to supply the first diagnosis voltage to the control line and a second diagnosis process of determining whether or not the pilot signal line is abnormal based on the output signal of the abnormality diagnosis circuit obtained when controlling the second diagnosis voltage supply circuit to supply the second diagnosis voltage to the pilot signal line in a state where the switching element is maintained in OFF state.

2. The electronic control unit according to claim 1, wherein the voltage supply circuit includes only the first diagnosis voltage supply circuit, and wherein the processor determines whether or not the switching element is abnormal based on a level of the output signal of the abnormality diagnosis circuit obtained when turning on and off the switching element while controlling the first diagnosis voltage supply circuit to supply the first diagnosis voltage of a fixed voltage to the control line as the first diagnosis process.

3. The electronic control unit according to claim 1, wherein the voltage supply circuit includes only the first diagnosis voltage supply circuit, and wherein the processor determines whether or not the switching element is abnormal based on an edge of the output signal of the abnormality diagnosis circuit obtained when turning on and off the switching element while controlling the first diagnosis voltage supply circuit to supply the first diagnosis voltage, which is a pulse-like voltage, with a predetermined frequency to the control line as the first diagnosis process.

4. The electronic control unit according to claim 1, wherein the voltage supply circuit includes only the second diagnosis voltage supply circuit, and wherein the processor determines whether or not the pilot signal line is abnormal based on a level of the output signal of the abnormality diagnosis circuit obtained when controlling the second diagnosis voltage supply circuit to supply the second diagnosis voltage of a fixed voltage to the pilot signal line in a state where the switching element is maintained in OFF state as the second diagnosis process.

5. The electronic control unit according to claim 1, wherein the voltage supply circuit includes only the second diagnosis voltage supply circuit, and wherein the processor determines whether or not the pilot signal line is abnormal based on an edge of the output signal of the abnormality diagnosis circuit obtained when controlling the second diagnosis voltage supply circuit to supply the second diagnosis voltage, which is a pulse-like voltage, with a predetermined frequency to the pilot signal line in a state where the switching element is maintained in OFF state as the second diagnosis process.

6. The electronic control unit according to claim 4, wherein the processor performs the second diagnosis process when the charging cable is not connected to the vehicle.

7. The electronic control unit according to claim 1, wherein the voltage supply circuit includes both the first diagnosis voltage supply circuit and the second diagnosis voltage supply circuit, and wherein the processor performs the second diagnosis process after performing the first diagnosis process.

8. The electronic control unit according to claim 7, wherein the processor first determines whether or not the switching element is abnormal based on a level of the output signal of the abnormality diagnosis circuit obtained when turning on and off the switching element while controlling the first diagnosis voltage supply circuit to supply the first diagnosis voltage of a fixed voltage to the control line as the first diagnosis process, and then determines whether or not the pilot signal line is abnormal based on a level of the output signal of the abnormality diagnosis circuit obtained when controlling the second diagnosis voltage supply circuit to supply the second diagnosis voltage of a fixed voltage to the pilot signal line in a state where the switching element is maintained in OFF state as the second diagnosis process.

9. The electronic control unit according to claim 7, wherein the processor first determines whether or not the switching element is abnormal based on an edge of the output signal of the abnormality diagnosis circuit obtained when turning on and off the switching element while controlling the first diagnosis voltage supply circuit to supply the first diagnosis voltage, which is a pulse-like voltage, with a predetermined frequency to the control line as the first diagnosis process, and then determines whether or not the pilot signal line is abnormal based on an edge of the output signal of the abnormality diagnosis circuit obtained when controlling the second diagnosis voltage supply circuit to supply the second diagnosis voltage, which is a pulse-like voltage, with a predetermined frequency to the pilot signal line in a state where the switching element is maintained in OFF state as the second diagnosis process.

10. The electronic control unit according to claim 7, wherein the processor performs the second diagnosis process after performing the first diagnosis process when the charging cable is not connected to the vehicle.

11. The electronic control unit according to claim 5, wherein the processor performs the second diagnosis process when the charging cable is not connected to the vehicle.

12. The electronic control unit according to claim 8, wherein the processor performs the second diagnosis process after performing the first diagnosis process when the charging cable is not connected to the vehicle.

13. The electronic control unit according to claim 9, wherein the processor performs the second diagnosis process after performing the first diagnosis process when the charging cable is not connected to the vehicle.

* * * * *

(12) SUPPLEMENTAL EXAMINATION CERTIFICATE

United States Patent  
Takashima et al.

(10) Number: US 9,114,715 F1  
(45) Certificate Issued: Jul. 28, 2016

Control No.: 96/000,145  
Primary Examiner: My Trang Ton

Filing Date: May 24, 2016

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 9,199,538 | 12/2015 | Tomokazu Masuda |
| 7,688,024 | 03/2010 | Ryuichi Kamaga |

FOREIGN PATENT DOCUMENTS

| | | |
|---|---|---|
| JP | 2011-004448 | 01/2011 |